United States Patent
Shepard (10) Patent No.: US 7,715,953 B2
(45) Date of Patent: May 11, 2010

(54) TRAILER BACKING UP DEVICE AND METHOD

(75) Inventor: Daniel Robert Shepard, North Hampton, NH (US)

(73) Assignee: Glimpse Waters, Inc., North Hampton, NH (US)

( * ) Notice: Subject to any disclaimer, the term of this patent is extended or adjusted under 35 U.S.C. 154(b) by 1402 days.

(21) Appl. No.: 10/831,695

(22) Filed: Apr. 24, 2004

(65) Prior Publication Data

US 2004/0215374 A1    Oct. 28, 2004

Related U.S. Application Data

(60) Provisional application No. 60/465,837, filed on Apr. 25, 2003.

(51) Int. Cl.
*G06F 17/00* (2006.01)
(52) U.S. Cl. .......................................... 701/1; 280/400
(58) Field of Classification Search .............. 280/400, 280/477, 442, 476.1, 479.2, 405.1, 432, 443, 280/463, 482, 81.6, 837, 406.2; 359/843; 188/112 R; 33/264, 286; 116/31; 340/436, 340/431; 701/1, 41, 36; 296/168; 180/14.4, 180/14.6
See application file for complete search history.

(56) References Cited

U.S. PATENT DOCUMENTS

| | | | | |
|---|---|---|---|---|
| 3,833,928 | A * | 9/1974 | Gavit et al. | 340/431 |
| 4,040,006 | A * | 8/1977 | Kimmel | 340/431 |
| 4,122,390 | A * | 10/1978 | Kollitz et al. | 340/870.38 |
| 5,001,639 | A * | 3/1991 | Breen | 701/70 |
| 5,247,442 | A * | 9/1993 | Kendall | 701/41 |
| 5,579,228 | A * | 11/1996 | Kimbrough et al. | 701/41 |
| 6,292,094 | B1 * | 9/2001 | Deng et al. | 340/431 |
| 6,806,809 | B2 * | 10/2004 | Lee et al. | 340/431 |

* cited by examiner

*Primary Examiner*—Yonel Beaulieu (57) ABSTRACT

The present invention helps a driver steer a vehicle while backing up a trailer. A trailer being pushed wants to turn around and be pulled (i.e., to jackknife). To compensate for this instability, the driver must skillfully control his steering to cause the trailer to alternately move to be pulled from the opposite side thereby repeatedly crossing the centerline of the pushing vehicle. The moment when the trailer crosses this centerline is the moment of greatest instability and the position in which the driver would most desire to have the trailer travel. A pointer indicates in what direction the trailer is presently being directed; to backup the trailer, the driver turns the vehicle's wheel such that the pointer is kept pointing in the direction of the intended trailer destination. The present invention can be adapted to most vehicle and trailer combinations with minimal cost and complexity.

20 Claims, 7 Drawing Sheets

|  | | HITCH ANGLE | | | | | | | | | | | | | | | |
|---|---|---|---|---|---|---|---|---|---|---|---|---|---|---|---|---|---|
|  |  | -40 | -35 | -30 | -25 | -20 | -15 | -10 | -5 | 0 | 5 | 10 | 15 | 20 | 25 | 30 | 35 | 40 |
|  | -50 | -58 | -48 | -39 | -31 | -24 | -17 | -11 | -5 | 0 | J | J | J | J | J | J | J | J |
|  | -45 | -64 | -52 | -42 | -33 | -25 | -18 | -11 | -5 | 0 | J | J | J | J | J | J | J | J |
|  | -40 | -75 | -59 | -45 | -35 | -26 | -18 | -11 | -5 | 0 | J | J | J | J | J | J | J | J |
| S | -35 | -102 | -71 | -52 | -38 | -27 | -19 | -12 | -5 | 0 | J | J | J | J | J | J | J | J |
| T | -30 | -J | -119 | -66 | -44 | -30 | -20 | -12 | -6 | 0 | J | J | J | J | J | J | J | J |
| E | -25 | -J | -J | -J | -60 | -35 | -22 | -12 | -6 | 0 | J | J | J | J | J | J | J | J |
| E | -20 | -J | -J | -J | -J | -52 | -25 | -13 | -6 | 0 | J | J | J | J | J | J | J | J |
| R | -15 | -J | -J | -J | -J | -J | -42 | -16 | -6 | 0 | J | J | J | J | J | J | J | J |
| I | -10 | -J | -J | -J | -J | -J | -J | -30 | -7 | 0 | J | J | J | J | J | J | J | J |
| N | -5 | -J | -J | -J | -J | -J | -J | -J | -16 | 0 | J | J | J | J | J | J | J | J |
| G | 0 | -J | -J | -J | -J | -J | -J | -J | -J | 0 | J | J | J | J | J | J | J | J |
|  | 5 | -J | -J | -J | -J | -J | -J | -J | -J | 0 | 16 | J | J | J | J | J | J | J |
| A | 10 | -J | -J | -J | -J | -J | -J | -J | -J | 0 | 7 | 30 | J | J | J | J | J | J |
| N | 15 | -J | -J | -J | -J | -J | -J | -J | -J | 0 | 6 | 16 | 42 | J | J | J | J | J |
| G | 20 | -J | -J | -J | -J | -J | -J | -J | -J | 0 | 6 | 13 | 25 | 52 | J | J | J | J |
| L | 25 | -J | -J | -J | -J | -J | -J | -J | -J | 0 | 6 | 12 | 22 | 35 | 60 | J | J | J |
| E | 30 | -J | -J | -J | -J | -J | -J | -J | -J | 0 | 6 | 12 | 20 | 30 | 44 | 66 | 119 | J |
|  | 35 | -J | -J | -J | -J | -J | -J | -J | -J | 0 | 5 | 12 | 19 | 27 | 38 | 52 | 71 | 102 |
|  | 40 | -J | -J | -J | -J | -J | -J | -J | -J | 0 | 5 | 11 | 18 | 26 | 35 | 45 | 59 | 75 |
|  | 45 | -J | -J | -J | -J | -J | -J | -J | -J | 0 | 5 | 11 | 18 | 25 | 33 | 42 | 52 | 64 |
|  | 50 | -J | -J | -J | -J | -J | -J | -J | -J | 0 | 5 | 11 | 17 | 24 | 31 | 39 | 48 | 58 |

FIGURE 10

```
float backingEquation()
{
  int k, kMax, side;
  float alpha, beta, delta;
  float newHitchAngleRadians, lastHitchAngleRadians, turnRadius;
  // Globals referenced:
  //   hitchAngleDegrees,steeringAngleDegrees,meter_half_angle,trailerLength if (hitchAngleDegrees < -meter_half_angle)
            return -180.0;
      else if (hitchAngleDegrees > meter_half_angle)
            return 180.0;
      else if (hitchAngleDegrees == 0) {
            if (steeringAngleDegrees == 0)
                  return 0.0;
            return steeringAngleDegrees > 0 ? -180.0 : 180.0;
      }
      newHitchAngleRadians = rad(hitchAngleDegrees);
      turnRadius = angleToTurnRadius(steeringAngleDegrees);
      k = 0;
      kMax = (int)(meter_half_angle * (PI * turnRadius) / (180.0 * dX));
      kMax = kMax > 0 ? kMax : -kMax; // # steps where meter goes off scale
      side = hitchAngleDegrees > 0 ? 1 : -1;
      do {       /* do until hitch angle projection crosses zero... */
            lastHitchAngleRadians = newHitchAngleRadians;

alpha=2.0*asin(dX*sin(newHitchAngleRadians)*0.5/trailerLength);
            beta=dX/turnRadius;
            delta=alpha-beta; //calc of delta replaceable by Taylor series if (newHitchAngleRadians > 0 && delta > 0)
                  return 180.0;
            if (newHitchAngleRadians < 0 && delta < 0)
                  return -180.0;

newHitchAngleRadians += delta;
            if (++k >= kMax) { break; }
      } while ((newHitchAngleRadians >= 0 && lastHitchAngleRadians >= 0) ||
             (newHitchAngleRadians <  0 && lastHitchAngleRadians <  0) );
      return (( k*dX) * (180.0/(PI*turnRadius))); // k*dX = distance backed
} // © 2004, Daniel R. Shepard
```

FIGURE 11

```
float angleToTurnRadius(float turnSample)
{ // value returned in same Units-of-Measure as wheel base & trailer length float hitchRadius, backWheelRadius; // , frontWheelRadius;
  int side;
  // Globals referenced:
  //   wheelBase, hitchLength, hitchLengthSquared if (turnSample == 0)
    return 10000.0;

side = turnSample > 0 ? 1 : -1;
  if (turnSample >= 90 || turnSample <=-90)
    return (float)(hitchLength * side);

// frontWheelRadius = wheelBase / sin(rad((float)(turnSample)));
  // If rear wheels turn same as front, frontWheelRadius = backWheelRadius backWheelRadius = wheelBase / tan(rad((float)(turnSample)));
  hitchRadius = sqrt(backWheelRadius*backWheelRadius + hitchLengthSquared);

return (float)(hitchRadius * side);
} // © 2004, Daniel R. Shepard
```

FIGURE 12

TRAILER BACKING UP DEVICE AND METHOD

CROSS REFERENCE TO RELATED APPLICATIONS

This application claims the benefits of U.S. Provisional Application No. 60/465,837, filed on Apr. 25, 2003 and titled "TRAILER BACKING UP DEVICE AND METHOD", the entire disclosure of which is hereby incorporated by reference.

REFERENCE TO A SEQUENCE LISTING, A TABLE, OR A COMPUTER PROGRAM LISTING COMPACT DISK APPENDIX

Attached hereto and incorporated herein as Appendix A, is a computer printout containing the source codes for one embodiment of the present invention. This source code is described more completely herein. Pursuant to 37 CFR 1.96 (a)(2)(ii), a listing of this software code is found in an accompanying protective cover and is designated "COMPUTER PRINTOUT APPENDIX PURSUANT TO 37 CFR 1.96(a)(2)(ii)"

A portion of the disclosure of this patent document and its appendix contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

REFERENCE REGARDING FEDERAL SPONSORSHIP

Not Applicable

STATEMENT REGARDING FEDERALLY SPONSORED RESEARCH OR DEVELOPMENT

Not Applicable.

FIELD OF THE INVENTION

The present invention relates to trailer systems, and more particularly to trailer systems comprising means to direct the vehicle in which way to steer so as to precisely back and control the direction of a trailer while pushing that trailer.

SUMMARY OF THE INVENTION

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline of the pushing vehicle. The moment when the trailer crosses this centerline is the moment when the system goes unstable and yet is the position in which the driver would most desire to have the trailer travel.

Prior art reveals several attempts to address the problems associated with backing a trailer. The simplest solutions address parts of the problem ranging from ways of sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). While these solutions are helpful, they only each address a part of the backing problem.

To be most beneficial, the solution must address the whole problem. Furthermore, a solution must be economical, be simple in operation, and be adaptable to most two-vehicle configurations (wherein one vehicle is powered and controls the backing and the other is the trailer). Solutions such as Kendall proposed in his U.S. Pat. No. 5,247,442 is a complete solution but fails some of these tests. The Kendall solution utilizes a wound up string that is pulled out towards the desired direction of travel of the trailer, making it complex to use and potentially requiring multiple operators for safe operation. A superior solution, as will be shown herein, is to solve the basic mathematical relationships rather than comparing the differences between the angle of an unfurled string and the trailer's bumper as an approximation of the steering error for which the system must correct. Furthermore, a proper mathematical solution will naturally incorporate into a single solution the proper handling of left and right turns, rather than requiring separate machine states. A preferred approach to implement the Kendall solution, as shown herein, would be to enable the driver of the tractor (the control vehicle) to operate a pointer such that that driver would either maintain the direction of the pointer in the desired direction and then be shown where to turn the steering or, perhaps even better, to maintain the direction of the pointer in the desired direction and then have the steering follow automatically.

Kimbrough et al. in their U.S. Pat. No. 5,579,228 teach a complete solution and one should applaud their rigorous approach to the mathematics. But, the Kimbrough solution requires that the wheels of the trailer be steerable by electro-mechanical servos controlled by the central processing unit and therefore fails the test of adaptability as most trailers have wheels that are not steerable. The Kimbrough solution also fails the economical test as a steerable trailer as suggested would be costly and the extensive mathematical solutions could potentially require a more costly central processing unit to run the calculations in real time. The many parameters (and their sensors) to the mathematical calculations will likely increase complexity and cost.

Deng et al. in their U.S. Pat. No. 6,292,094 likewise teach a complete solution. But again fail the economical and adaptability tests with a control vehicle having both front and rear wheel steering. Many other attempts at solving this problem fail to provide an acceptable solution along the lines of the present invention.

The present invention, when used in conjunction with a trailer to be backed-up, will indicate to the driver which direction to steer his vehicle as well as when and how much to steer. This is accomplished with an inexpensive mechanism that can be adapted to any combination of vehicle and trailer. The mathematical solution is sufficiently accurate to provide a working solution without requiring a costly processor to solve a level of precision beyond what the operator can perceive through a user interface that is simple and easy to use.

The present invention can be installed in any vehicles equipped for pushing a trailer. In operation in a typical vehicle, a pointer would indicate, for the current position of the vehicle's steering wheel, in what direction the trailer is projected to follow; to back-up the trailer, the driver would turn the vehicle's wheel such that the pointer is kept pointing in the direction of the intended trailer destination. With minimal modification, one would still have the option, though at a greater expense, of incorporating servomechanisms which would cause the vehicle to steer itself while the driver would simply indicate the direction desired for the trailer to travel (along with controlling the acceleration and breaking). With the incorporation of GPS or other direction sensing equipment, the driver might only be required to supervise the accelerator and brake.

BRIEF DESCRIPTION OF THE DRAWINGS

FIG. 11 is a partial source code listing showing an iterative implementation of the backing equation.

DESCRIPTION OF THE PREFERRED EMBODIMENT

The present invention is a means to accurately back up one vehicle (also known as the tractor, the control vehicle, the powered vehicle, or the vehicle) while controlling the backing of another attached vehicle (also known as the trailer) while keeping that attached trailer vehicle precisely aimed at and guided towards a targeted destination. The present invention can be applied anywhere one vehicle must control another vehicle by pushing through a single point of contact and includes car and trailer, tractor and wheeled container, or tow truck and broken-down car, to name a few. The connection between the two vehicles is accomplished with a pivotable connection or a ball-joint (called a hitch). When the two vehicles are in a straight line, the angle of the hitch, known as the hitch angle (also known as the articulation angle or the hinge), is zero degrees. This straight-line position can be achieved by driving the vehicle forward far enough to cause the trailer to be pulled directly behind the vehicle.

Figure 1:
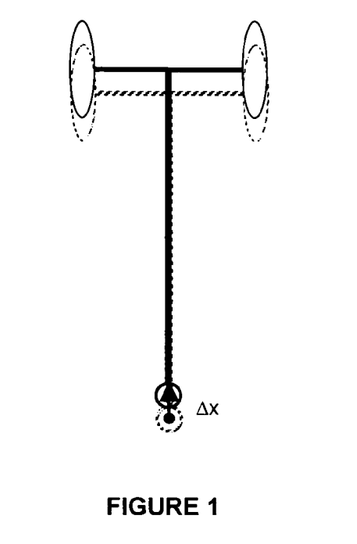
FIG. 1 illustrates a trailer being backed up an incremental straight distance when the trailer and backing force are in-line.
Figure 2A:
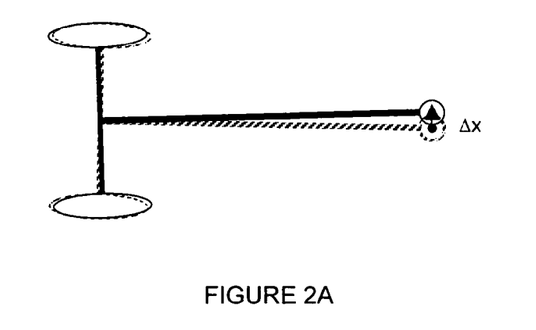
FIG. 2 illustrates the change in the hitch angle between a trailer and a vehicle pushing the trailer an incremental straight distance for two initial angular orientations of the trailer and vehicle.
Figure 2B:
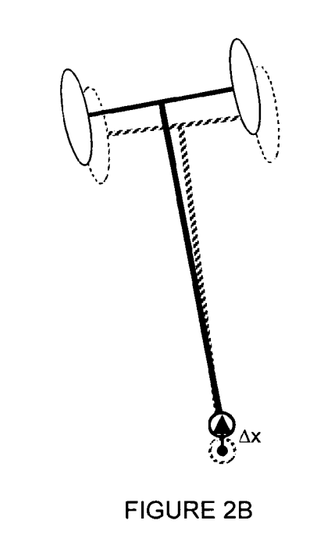

Refer now to the figures, which show a preferred embodiment of the invention. FIG. 1 shows the ideal behavior of a trailer being pushed by a vehicle. As the vehicle backs up some distance, $\Delta x$, the trailer moves an equal distance in the same direction. FIG. 2 shows a more typical behavior of a trailer being pushed by a vehicle. In FIG. 2A, the centerline of the trailer and the $\Delta x$ direction are perpendicular. At this point, all of the $\Delta x$ motion is translated into rotating the trailer. In FIG. 2B, as is most often the case in normal operation, a portion of the force in the $\Delta x$ direction is translated into backing up the trailer while a portion is translated into rotating the trailer. Typically, most of the force in the $\Delta x$ direction is translated into backing up the trailer because the centerline of the trailer and the $\Delta x$ direction (along the center line of the vehicle) are kept close to parallel. However, following this backing up of the distance $\Delta x$, the centerline of the trailer and the $\Delta x$ direction will be less parallel due to the rotation that occurred. As a result, if the vehicle were to back up an additional distance of $\Delta x$, an even greater portion of the force would be translated into rotating the trailer. Each successive distance $\Delta x$ backed up will translate into a growing portion to be applied to rotating the trailer until, and as is shown in FIG. 2A, the center line of the trailer and the $\Delta x$ direction are perpendicular. If the vehicle backs up even further, the part of that force that is in the direction of backing up the trailer becomes negative which is to say that the trailer begins to be pulled and will move towards the center line of the vehicle until the trailer is ultimately towed directly behind the vehicle—the most stable position of the vehicle and trailer in motion. Of course, in real life, if this backing were continued, the trailer would keep turning until it collides with the side of the vehicle. This action of a trailer turning around to follow the point that is pushing it is called jackknifing.

Figure 3:
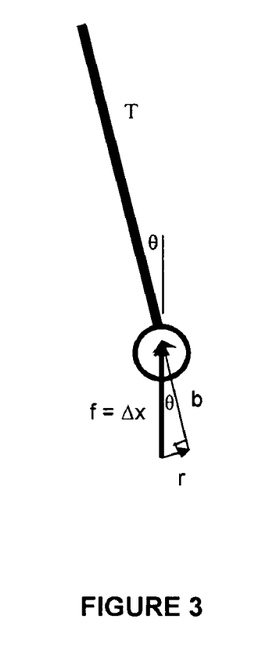
FIG. 3 illustrates the vector forces on the trailer at the hitch relating to rotating the trailer and to backing-up the trailer.

Refer now to FIG. 3 for an explanation of this pair of vector forces on the trailer when a vehicle is backing up in a straight line a distance of $\Delta x$. FIG. 3 shows that the force, f, at the hitch of the trailer, T, is the sum of two vectors, b and r, that meet each other at a right angle. When a force, f, is applied to the hitch of a trailer by a backing vehicle, part of that force, b, is parallel to (i.e., in-line with) the centerline of the trailer and is, therefore, in the direction of backing up the trailer. However, the other part of the force, r, is perpendicular to the centerline of the trailer and is in the direction of rotating the trailer about a point midway between its two wheels (i.e., on the centerline of the trailer). The angle between the direction of the applied force and the direction of the centerline of the trailer is called the hitch angle and, for this discussion, shall be called Theta ($\theta$). If we assume that the force, f, applied is proportional to the distance backed up, $\Delta x$, we can calculate the magnitudes of b and r as being $\Delta x \cos(\theta)$ and $\Delta x \sin(\theta)$, respectively. In practice, the hitch angle is a ball joint that enables some motion in the vertical direction, but this aspect of motion is ignored in the present invention as this motion is not thought to significantly change the resulting operation of a system equipped with the present invention and to do otherwise would only cause an implementation of the solution to be more costly without adequate benefit to justify that cost.

For the purpose of this explanation, we will speak in terms of discreet steps of distance, $\Delta x$, instead of in terms of calculus and integrals because the solution discussed herein is performed with an approximation technique. To re-obtain an in-line position of vehicle and trailer, the vehicle must turn while backing. As a result, a series of $\Delta x$ distances backed up will actually fall along an arc, not a straight line. The radius of that arc and the total distance backed (sum of $\Delta x$'s or, more precisely, the integral) determine how quickly the vehicle and trailer will return to an in-line position.

When the operator of a vehicle attempts to back up a trailer, he wants to keep the trailer following a path that runs directly at the target—the intended line of travel. While backing up, the trailer will turn away from the intended line of travel due to the jackknifing effect. A highly skilled operator will turn the vehicle toward the side to which the trailer is jackknifing and will gradually reduce the arc of his turn as the trailer approaches the intended line of travel such that the vehicle will be moving in a straight line (the radius of the arc approaches infinity) just as the trailer once again parallel's the intended line of travel. As soon as this alignment of intended line of travel, trailer direction and vehicle direction are reached, the system becomes unstable wherein the trailer will begin to jackknife. To gain control, the operator must again turn the vehicle toward the side to which the trailer is jackknifing.

What often happens with the less skillful operator is that at the moment when the trailer is returned to the intended line of travel, the vehicle is not also in-line with the trailer. In this case, with only the trailer on the intended line of travel, the operator must now turn the vehicle back to be in-line with the intended line of travel. But this additional backing to get the vehicle on the intended line of travel will cause the trailer to continue to turn beyond the intended line of travel. By the time the vehicle and trailer are once again in-line, the trailer is no longer heading in the intended line of travel. Often, the amount by which the trailer is off the intended line of travel to this second side is greater than the amount by which it had been off on the first side. When this occurs, the operator finds himself in a growing oscillation wherein the trailer keeps backing generally toward the intended target but with less and less control. Frequently, this oscillation can only be halted by driving the vehicle forward, directly away from the target which returns the vehicle and trailer to an in-line position that is pointed at the target, but a portion of the distance that had been covered while backing up will have been lost to the driving forward needed to rescue the operation.

The present invention provides an indication of the direction in which the trailer and vehicle will be headed when both trailer and vehicle are in-line. This indication is computed from constant information such as the length of the trailer from the axel to the hitch and variable information such as the current radius of the arc of the vehicle and the angle of the centerline of the trailer and the vehicle at the hitch (the hitch angle). There are many ways to compute the necessary information.

To compute the change in the hitch angle resulting from an incremental displacement, $\Delta x$, of the hitch, two components must be considered: the increase associated with the rotation of the trailer and the decrease associated with the turning of the vehicle. The sum of these two components must be decreasing when compared over two successive increments of motion ($\Delta x$) in order to obtain convergence on a solution. When this does not occur, the vehicle operator must be alerted to change his steering or to drive forward (directly away from the target) to get the vehicle, trailer and target all in-line before continuing.

Figure 4:
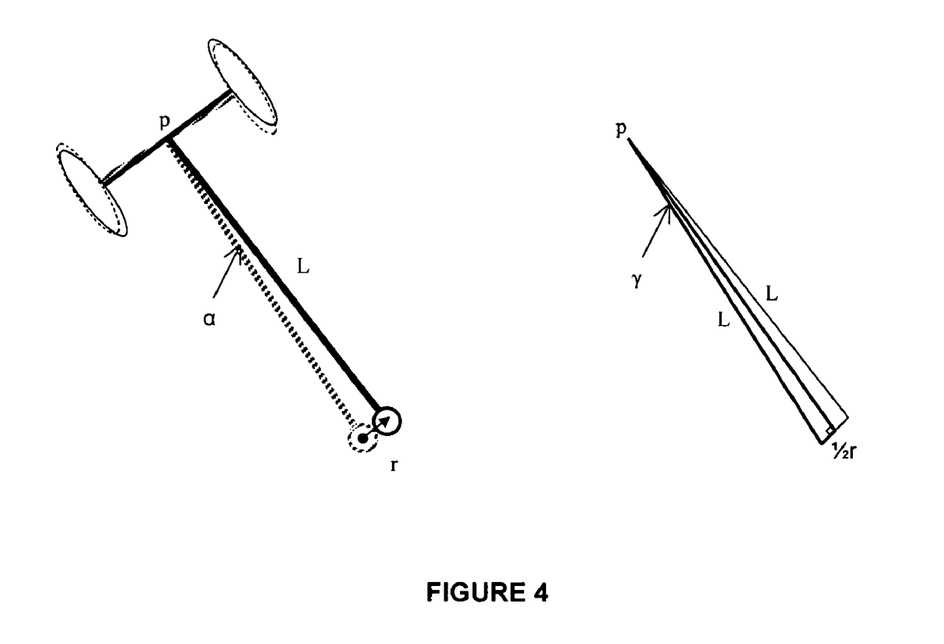
FIG. 4 illustrates the rotation resulting from the rotational component of the backing force when backing up and the associated geometries for such calculations.

Referring to FIG. 4, to calculate the angular contribution from the rotation of the trailer, $\alpha$, to the change in hitch angle resulting from an incremental displacement, $\Delta x$, one must recognize the geometry of that rotation. The length of the trailer, L, forms two of the sides of a triangle formed when the trailer rotates about point p, where the third side is the rotation contribution component, r, as discussed above and shown in FIG. 3. From that discussion, r has the magnitude $\Delta x \sin(\theta)$. The angle of rotation, $\alpha$, is bisected in the formation of two similar right triangles each having L for their hypotenuse and $\gamma$ for half of bisected angle $\alpha$. Simple geometry dictates the relationship $\sin \gamma = \frac{1}{2} r/L$ which can be restated as $\gamma = \sin^{-1}(\frac{1}{2} r/L)$. The angular contribution from the rotation of the trailer, $\alpha$, is therefore equal to $2 \sin^{-1}(r/2L)$. Substituting in for r yields: $\alpha = 2 \sin^{-1}(\Delta x \sin(\theta)/2L)$.

Figure 5:
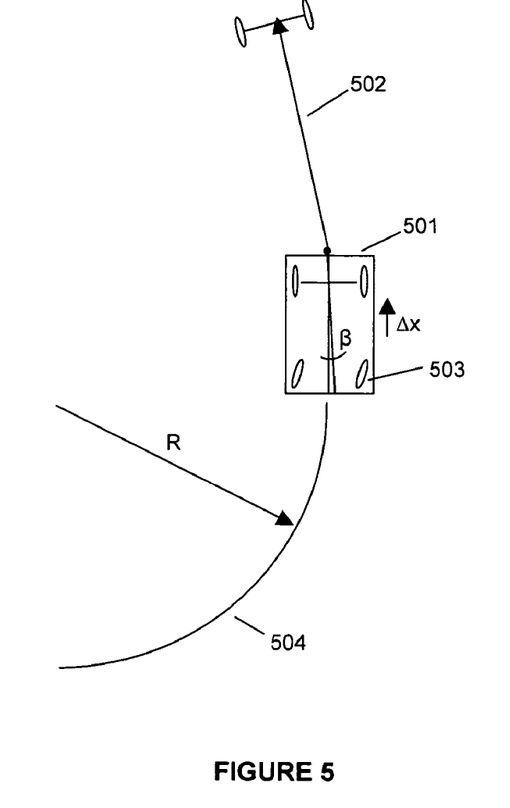
FIG. 5 illustrates the change in the hitch angle between a trailer and a vehicle as that vehicle moves an incremental distance in an arc.

Referring to FIG. 5, a vehicle, 501, pushes a trailer, 502, as it backs up in an arc. To calculate the contribution from the turning of the vehicle, $\beta$, to the change in hitch angle resulting from an incremental backing displacement, $\Delta x$, one must recognize the geometry of the curved path of the vehicle as well. Even if the vehicle and the trailer are momentarily in-line resulting in no angular change in the direction of the trailer, the vehicle is assumed to be following a circular path and the angular change in the direction of the vehicle will effect the angle between the vehicle and the trailer. The radius of this circle, R, is the turning radius and is a function of the steering angle of the front wheels, 503. The circumference of the circular path, 504, on which the vehicle travels equals $2\pi R$ and corresponds to 360°. The angular contribution of the vehicle by following this curved path is determined by taking the same percentage out of 360° that the incremental distance traveled by the vehicle takes out of the entire circumference of the circle on which this curved path exists. In other words, $\Delta x/2\pi R = \beta/360°$ or $\beta = 180\Delta x/\pi R$.

Figure 6:
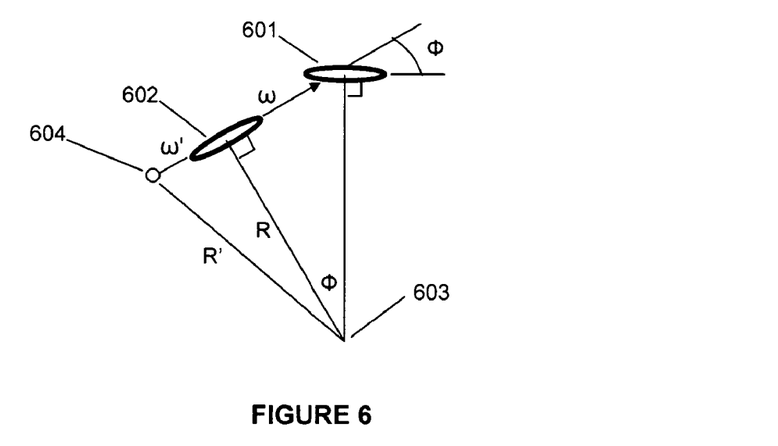
FIG. 6 illustrates the geometries associated with calculating the turning radius of a vehicle from the angular position of the turned front tire.

Computation of the turning radius of a vehicle can be simplified and is shown geometrically in FIG. 6. Front wheel, 601, of the vehicle steers by turning about a point of rotation at or near its center that is approximately in line with rear wheel, 602, and their centers are separated by a distance called the wheel base, w. When steering occurs, front wheel, 601, rotates some amount shown as angle $\phi$. The center point, 603, of the circle of turning is found at the point of intersection of two lines, one each drawn through the center of and perpendicular to the path of travel of each wheel; this dictates that these two lines will meet at an angle equal to the steering angle, $\phi$. Rear wheel turning radius, R, is computed with simple geometry as: $R = \omega/\tan(\phi)$. This approximation will be good enough in many cases. But, it can be made more precise without much effort by incorporating the added distance, $\omega'$, from the center of rear wheel, 602, to the hitch-ball, 604, that is at the point of the hitch rotation (assuming the hitch ball is in-line with the two wheels). This is computed using the pythoragorithan theorem resulting in the equation for the turning radius, R', of the hitch-ball, 604, at the point of the hitch rotation: $R' = \text{SQRT}((\omega/\tan(\phi))^2 + \omega'^2)$. It should be noted that this is an approximation and, as will be addressed below regarding precision, does not have to be perfect (further accuracy would require that the second front and rear wheels be included in the calculation as well as the positioning of the hitch-ball half way between the left and right rear wheels rather than assuming it is in-line with the front and rear wheel). It should also be noted that with front and rear wheel steering, this formula would be modified.

Since the steering wheel is coupled to the wheel steering mechanism, it would be possible to put a sensor on the steering wheel or its shaft and detect the angular position of that steering wheel or shaft and translate that angular position into the angular position of the front wheels. Furthermore, a sensor relating to the steering of the vehicle could include sufficient computational capability (even if only in the form of a lookup table to convert from one measure to another) to sense either the steering wheel or shaft's angular position or the wheel's angular position and return the turning radius thereby saving the main processor the computation time of performing that translation. These variations will be clear to those skilled in the art.

Now, by combining the increase associated with the rotation of the trailer and the decrease associated with the turning of the vehicle into a single equation, the change in hitch angle, Δθ, resulting from an incremental distance, Δx, traveled by the vehicle can be expressed as:

$$\Delta\theta = 2\sin^{-1}(\Delta x \sin(\theta)/2L) - 180\Delta x/\pi R$$

The new hitch angle, θ', resulting from an incremental distance, Δx, traveled by the vehicle is expressed as:

$$\theta' = \theta + 2\sin^{-1}(\Delta x \sin(\theta)/2L) - 180\Delta x/\pi R.$$

This shall be called the backing equation.

Figure 7:
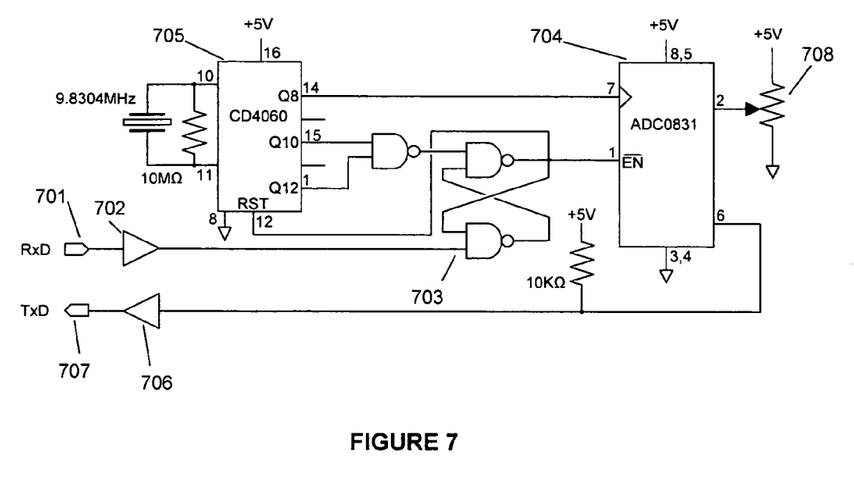
FIG. 7 illustrates a schematic for a remote angular position sensor.
Figure 8:
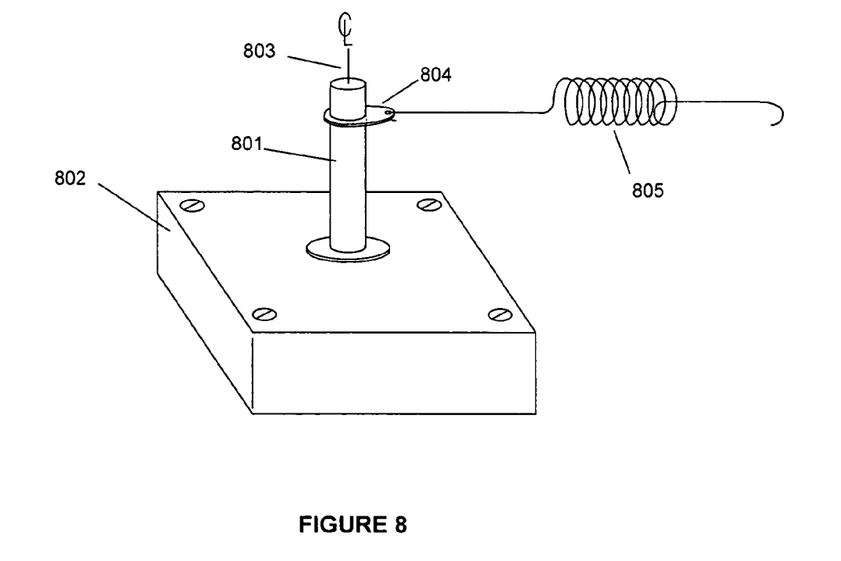
FIG. 8 illustrates a remote angular position sensor with attachment mechanism.

The angle of the front wheels in steering and the angle of the hitch can be measured with simple remote angle sensors. FIG. 7 shows a schematic diagram of one possible implementation of such a sensor. With this circuit, a data byte is sent into the sensor unit via a serial interface at input RxD, 701, to request a sample of the current angular position be taken and returned. This signal is buffered by line interface receiver, 702, for the voltage levels of the serial link (e.g., an RS-232 receiver) and the start bit of that data byte sets an R-S Flip-Flop, 703, formed by two NAND gates such that a serial Analog-to-Digital Converter, 704, such as the ADC0831 is enabled to run a sample conversion. A crystal oscillator, 705, such as the CD4060 is also enabled and drives the circuit until Analog-to-Digital Converter, 704, has transmitted its entire sample byte, including start and stop bits, at which point the R-S Flip-Flop, 703, is reset and the process halts until restarted by another incoming data byte. The sample byte transmitted is buffered through line driver, 706, and output from the sensor unit at TxD, 707. The value sampled is the voltage on potentiometer, 708, whereby the position of that potentiometer is a function of the mechanical linkages between the sensor unit and the two sides of the angle being measured. The sensor can be packaged in many ways, with one possible configuration shown in FIG. 8. In this example, the shaft of the potentiometer, 801, extends out of a box, 802, housing the electronics. This box, 802, is mounted above the angle to be measured such that the centerline, 803, of the potentiometer, 801, is generally in line with the axis of rotation of the angle to be measured. The box is mounted in a fixed position on one side of the angle to be measured (e.g., to the hitch arm when measuring the hitch angle or to the frame of the vehicle when measuring the steering angle). An attachment is made to the shaft of the potentiometer, 801, with an attachment arm, 804, by means of a spring, 805, or other device to a point on the other side of the angle to be measured (e.g., to the trailer near the hitch when measuring the hitch angle or to a point on the support of the front wheel that moves with that wheel when that wheel is turned when measuring the steering angle). A variety of angular position sensors are also commercially available.

Figure 9:
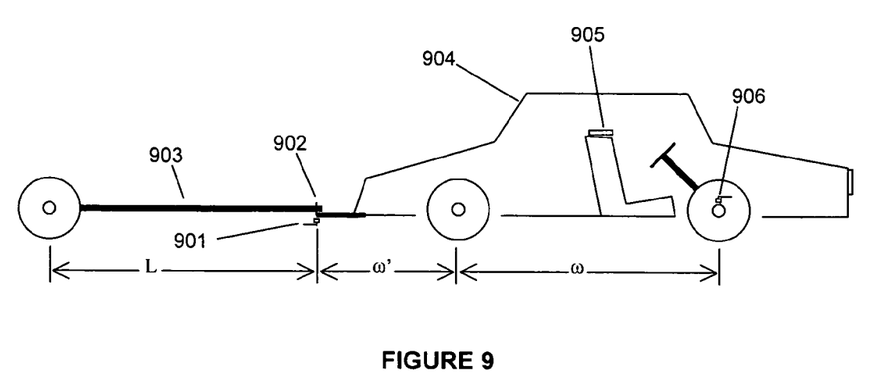
FIG. 9 illustrates possible positions for the sensors and the metering indicator for directing an operator while backing up a trailer.

With the above equations and an understanding of the angle sensors, one can understand an embodiment of the present invention as shown in FIG. 9. The hitch angle is measured by way of a sensor, 901, in close proximity to the hitch, 902, pivotably connecting the trailer, 903, to the vehicle, 904. This sensor measures absolute angular position whereby a measurement of zero degrees is calibrated for when the trailer and vehicle are in-line. This angle data is digitized and fed into the microcomputer, 905. The vehicle's turning radius can be determined by measuring the steering angle with an angular position sensor, 906, on the front wheel assembly of the vehicle. The calculations require that certain measurements of the vehicle-trailer system are known and/or have been input into the system including the wheel base, ω, the hitch length, ω' and the trailer length, L.

Calibration of the angle sensors includes determining the limits of travel and the center point of travel. Calibration values could be stored in non-volatile memory in the microcomputer. It has been noted that the angular sensors could perform a translation from the measured angle into other forms. The hitch angle could translate a reading from degrees into radians. The turning radius could be determined by measuring the steering angle or the steering wheel angle and translating into the turning radius (this would require that the steering angle sensing module would have, at least, the wheel base of the vehicle and, preferably, the wheel base and the hitch length). Furthermore, the angle sensing module could be preprogrammed with other data; for example, the hitch angle sensor module could be sold as a matched unit with a trailer in which case the hitch angle module could come preprogrammed with the length of that trailer and enable the central microcomputer to query that module for this additional data value rather than require the operator to have to enter the data during a configuration process or when a different trailer is being backed up.

Assuming that the turning radius of the vehicle does not change, the original value sensed for the turning radius is kept constant and, using this newly projected value for the hitch angle, the backing equation is recomputed. This continues in an iterative fashion, using the backing equation with the original turning radius and each newly projected value for the hitch angle, until the projected hitch angle reaches 0°. With each iteration, a variable is incremented to keep track of the number of iterations that have occurred. The iterations stop when the projected hitch angle reaches or crosses zero.

Just as a single increment of distance, Δx, can be used to determine the angular change in the vehicle's direction with the equation from above, β=180Δx/πR, the total angular change in the vehicle's direction can be determined from the number of iterations, k, by multiplying by k in that same equation, or Σβ=k180Δx/πR. Since the terminal hitch angle of 0° implies that the trailer and vehicle are in-line, the terminal direction of the vehicle indicates the direction of both the vehicle and the trailer when they are in-line. In other words, Σβ is the angular change in direction the vehicle will undergo to come in-line with the trailer, given the initial hitch angle and the current turning radius of the vehicle.

The angular change in direction, Σβ, is shown graphically to the operator. As stated above, one way this can be done is by converting Σβ to an analog voltage; this voltage is displayed on a traditional analog needle meter. The zero point would be set to the center of the meter's deflection range. The meter would be positioned in the vehicle in view of the operator when he is turned to look out the back of the vehicle (just as he would be looking when backing up with a trailer without the present invention) such that the needle would point straight out the back of the vehicle when Σβ reads zero. For the particular meter used, the angles of the needle should be measured on the face of the meter for its maximum and minimum deflections from this center position. These angles will correspond to the largest angle to the left and right that can be displayed. Scaling the output voltage for Σβ through setting the PWM duty cycle to fit the meter's scale should be clear to those versed in the art. When the needle is deflected to either its maximum or minimum position, the operator must assume that a potential jackknife condition may exist.

During operation, the operator will see on the meter the direction that the trailer will ultimately be headed for a given position of the steering wheel. If the meter is pointing too far from the trailer's target, the operator will know that the trailer is not going to be headed at that target when the vehicle and trailer come in-line. Immediate corrective action can be taken long before the danger of jackknifing occurs. The meter provides the operator with the missing feedback he needs to adjust his or her steering before the trailer is off course.

Figure 10:
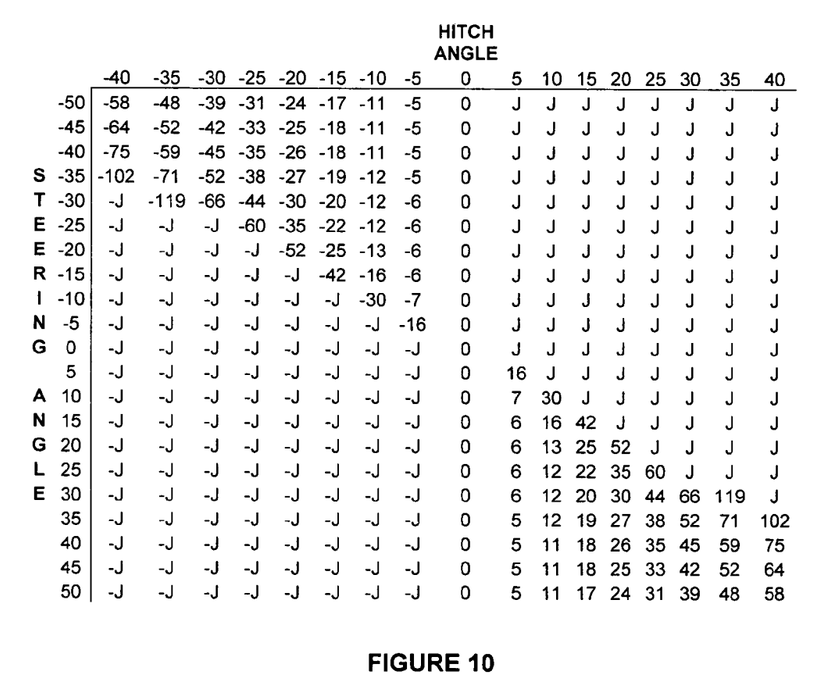
FIG. 10 lists a table of resulting directions (in degrees) for a given initial hitch angle and steering angle for a single set of parameters.

FIG. 10 lists a table of example data for a set of initial hitch angles (across the top of the table) and steering angles (along the left side of the table) for a single set of parameters comprising the wheel base of the vehicle, the trailer length, the hitch length, and the backing increment ($\Delta x$). The data points in the table correspond to the change in direction of the vehicle, in degrees, between the current position and point at which the vehicle and trailer become in-line with each other. An entry of "J" indicates a jackknife condition. As an example, if the hitch angle is 5° to the right and the steering angle is 10° the vehicle and trailer will become in-line at the point where the vehicle will have changed its direction by 7° from its starting direction. This table would be unique for a given set of parameters.

In the event that convergence on an in-line position between vehicle and trailer cannot be reached given the initial hitch angle and the current turning radius of the vehicle, an alarm could be signaled visually to notify the operator that the trailer has or is on track to jackknife. In addition to a visual alert when the vehicle and trailer are on track to jackknife, and audible alarm could optionally be included for imminent jackknife situations. But, withholding the alarm would be important when the hitch angle is very small. An audible alarm might not be asserted until the hitch angle exceeds a point of no return. This point of no return is actually a function of the vehicle's turning radius and the length of the trailer and should be when the hitch angle is so great that only an excessive amount of turning will recover the effort. In other words, if the present position of the steering will result in a jackknife condition, but the hitch angle is, so far, small enough that a modest correction in steering will recover the process, one might desire to design the system so as to give the operator a chance to adjust his or her steering before sounding an audible alarm that would otherwise be sounded every time the trailer crosses the centerline of the vehicle. For example, when the vehicle and trailer are nearly in-line but the vehicle turning radius is infinite (i.e., the vehicle is not turning), the trailer will be on track to jackknife and the projected hitch angle will go to infinity (as discussed above). This is clearly a recoverable situation and should not cause an alarm to be asserted. However, the operator of the vehicle should be notified via the visual notification that he should turn the vehicle more than his present turning radius. It would be a considerate addition to the device to indicate to which side the operator should turn as well because it might not be immediately apparent to which side the trailer is beginning to turn when the vehicle and trailer are nearly in-line.

The prototype implementation utilized a zWorld, Incorporated RCM3000 Development Kit comprising a RCM3010 Series RabbitCore Module which comprises a Rabbit 3000 Microprocessor having an instruction set based on the widely known Z80/Z180 microprocessor instruction set. A small analog meter was connected to Port F, pin 4 of the processor that was software configured as a Pulse Width Modulator (PWM) output and that drives the analog meter such that it indicates its left extreme when there is little or no current flowing (approximately a 0% duty cycle) and indicates its right extreme when slightly less than a 100% duty cycle is output via the PWM. A resistor in series with the meter was selected empirically to adjust for this maximum setting given a slightly less than a 100% duty cycle is output via the PWM—this enables the full scale to be adjusted via the software to accommodate different meters with slightly different characteristics. This prototype board also has two RS-232 serial ports in its standard configuration (serial port B and C) that incorporate standard RS-232 serial drivers. Serial port B was connected to the hitch angle sensor and serial port C was connected to the steering angle sensor. Port E, pin 7 was configured as a general purpose output pin and it drives a flasher LED such that writing a 1 bit causes the LED to flash in order to indicate a jackknife condition. Finally, Port G, bit 1 was configured as an input and was connected to a push-button that pulls this input pin to ground when pressed. This prototype configuration can easily be implemented on many commonly available single board computers and even on a number of single chip microcomputers. The present disclosure of the embodiment used in the prototype in not meant to limit the implementation to any particular form and one knowledgeable in the art will quickly recognize alternate implementations.

Figure 12:
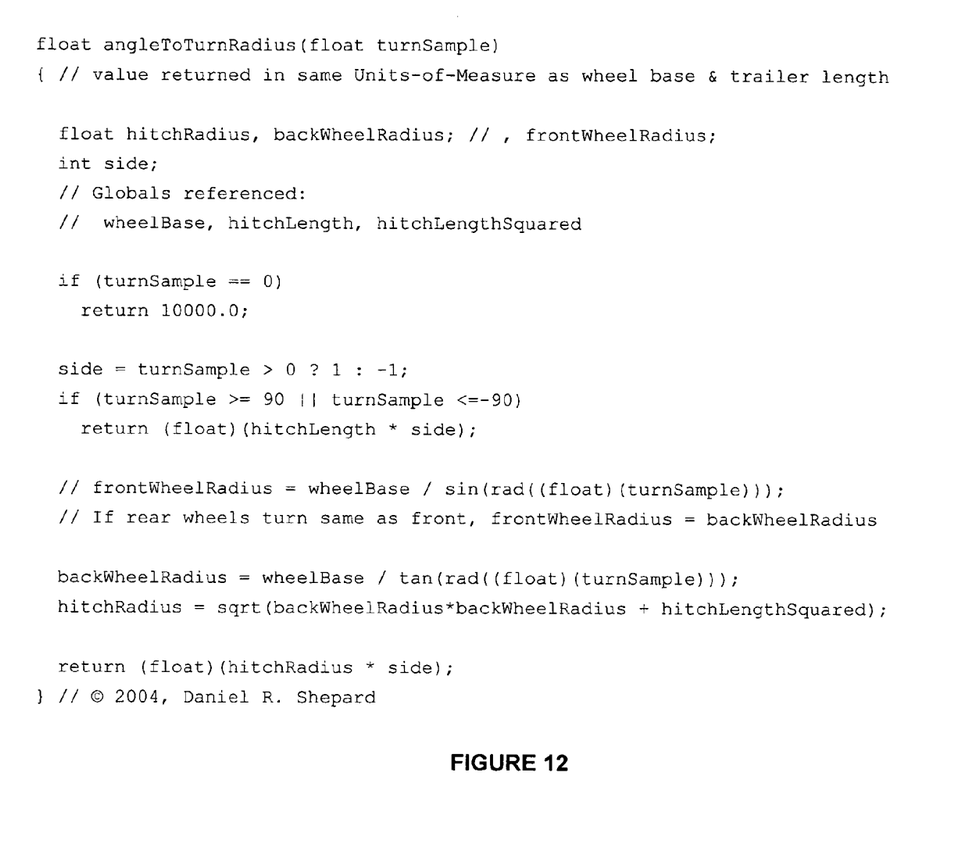
FIG. 12 is a partial source code listing showing an approximation of a turning radius calculation.

In operation, the microcomputer reads the current hitch angle and the vehicle's steering angle and each time the set of readings is made, the microcomputer runs a set of calculations. The calculations are run iteratively for a given pair of readings (see FIG. 11 for an example of code to iteratively compute the projected in-line direction of the vehicle and trailer from these two readings, relative to the vehicle's starting position—note that in the prototype source code, the backing equation is calculated entirely in radians to eliminate the need to convert from degrees to radians and back again on every iteration of the calculation). A constant incremental value for $\Delta x$ is used; the smaller the value of $\Delta x$ the more accurate the result, but the longer the iterative computation will take to complete. A tradeoff between accuracy and processing time (which is also a function of the processing speed of the microcomputer) may have to be made. In running the solution, the program iteratively computes the backing equation for the set of readings to project what the new hitch angle will be following each additional increment of travel, $\Delta x$. This iterative calculation continues until the new hitch angle crosses through zero which corresponds to the vehicle and trailer being in-line (when the angle equals zero) and then some. The number of iterations that are required until the new hitch angle crosses through zero is the number of increments of $\Delta x$ that the vehicle will have to back up, given the initial values of the hitch angle and steering angle, in order for the trailer and vehicle to become lined up. The steering angle is presumed to not change during the calculation and so too the turning radius is presumed not to change. As a result, since the number of increments has been calculated as a part of the iterative solution, the distance traveled along the arc of the turning radius can be computed and so too the change in angular direction of the vehicle. (The distance to be backed up could, optionally with additional display electronics, be displayed to the operator.) If the vehicle were to travel this distance (if it were to actually back up the distance computed in the iterative calculation while keeping the steering angle, and therefore the turning radius, constant), the vehicle and the trailer would be in-line with each other. As a result, by displaying the projected change in angular direction on a meter such that the number of degrees of change in angular direction calculated is the number of degrees of deflection shown on the needle of the meter, that meter can be positioned flat on the shoulder of the driver's seat such that the needle will point in that direction of the path behind the vehicle where the vehicle and trailer will be headed when the vehicle and trailer are in-line. Note that the meter would be positioned and calibrated such that a value of zero, that is to say that the calculation indicates that no change in direction will result in the vehicle and trailer being lined up (i.e., the trailer and vehicle were already lined up at the start of the calculation when the hitch angle and the vehicle's steering angle were sampled), would have the needle of the meter pointing directly back behind the vehicle. This needle position for a reading of zero change in direction should correspond to a duty cycle on the PWM of approximately 50%. The iterative backing calculation requires that some constant values will also have to be stored in the computer; these include, in addition to the hitch angle and the turning radius, the number of degrees that the meter can display or that can be displayed by a one-half scale deflection of the meter and the trailer length. In order to compute the turning radius (see FIG. 12 for an example of code to compute an estimate of the turning radius having sufficient accuracy to implement the prototype), in addition to the steering angle sample, some constant values will also have to be stored in the computer; these include the wheel base and the hitch length (the square of the hitch length can be precomputed to save processing time).

Noted that the precision of the system need only be as accurate as the operator can perceive given the resolution of the user interface. If a mechanical metering output device is utilized, one's eye might not be able to distinguish the difference between one projected direction and another projected direction if those two directions only differ by a few degrees. As such, the accuracy of the calculations need not be more precise than the operator could perceive on that output device such that bringing the vehicle and trailer in-line need only be generally in-line enough to guide the operator. This ability to limit the precision should help to keep the cost of the microcomputer down as the calculations can be simplified, iterated to a lesser degree of precision, or otherwise approximated. This also applies to the precision used for the sensing of the angular inputs and their translation into other forms, as would be the case when sensing the steering angle and translating that steering angle into the turning radius or in deciding whether or not to include the hitch length.

A variation on the present invention would be to have means to sense or otherwise input the desired direction for the trailer to travel and then indicate the sign and magnitude of the error. Such inputs could be accomplished with optical sensors on markers at or around the target or a manually controlled pointing device. GPS sensors could be incorporated.

If the turning radius of the vehicle cannot be sensed, taking successive readings of the hitch angle and computing what the turning radius must be in order to attain the hitch angle readings might approximate it. This approach would require that the vehicle actually be backed up for a few data samples (wherein the samples would be taken at constant, short time intervals and assuming that the backing speed is constant which it would generally be if the sample intervals are short) in order to estimate the turning radius before the meter could output the projected direction.

Precalibrated sensors are possible. This preferred embodiment utilizes sensors that transmit a data byte corresponding to a measured angle whenever any byte is received. A more complex sensor could be constructed, as would be apparent to one skilled in the art, such that the angle measurement byte is only transmitted when a specific byte is received. In this way, other bytes received could cause the transmission of other preprogrammed or real-time data bytes such as the wheel base of the vehicle (when used to measure steering angle), or the trailer length (when used to measure hitch angle), or other data such as a byte equal to the difference between two known angles (such as a difference equal to 90 or 180 degrees). In this way, the steering sensor could be incorporated in the vehicle and the system could query that sensor for other preprogrammed data regarding that vehicle (e.g., wheel base, hitch length, the byte value for zero degrees of turning, the byte value for a specific known angle to eliminate the need to calibrate the scale factor, or the like) or the angle sensor could be incorporated in the trailer and the system could query that sensor for other preprogrammed data regarding that trailer (e.g., trailer length, the byte value for the zero degree angle, the byte value for a specific known angle to eliminate the need to calibrate the scale factor, or the like).

Alternatively, when the trailer and vehicle are first oriented in-line and pointing at the target (by driving away from that target), a calibrate button could be pressed which would not only recalibrate the hitch angle to zero, but would also initialize the direction to the target which could then be tracked and maintained in the microcomputer; as the vehicle direction changes the direction to the target would be updated. This approach should be adequate for most cases as the cumulative errors in direction are not expected to become too great; if they do, the operator would simply have to recalibrate by pressing the calibrate button again when the trailer and vehicle are next in-line and pointing at the target.

Another variation would be to have the operator of the vehicle operate a pointer that he might keep directed at the target. This would be a variation whereby the present invention would indicate the sign and magnitude of the error. But this error, like the error value output by the other variations above, could be incorporated in the steering mechanism of the vehicle through a servomechanism or the like. With such a configuration, the vehicle would steer itself while the operator would simply operate a pointer that he might keep directed at the target along with the break and accelerator; in other words, for backing up a trailer, the operator would steer both the trailer and vehicle with a pointer at the target and the present invention would translate that pointing into steering data which would operate the turning of the wheels of the vehicle.

A variation on the computation may involve calculating the various order derivatives of the hitch angle. For example, knowing the hitch angle and backing up some distance $\Delta x$ and then rereading the hitch angle will yield the first derivative (change in hitch angle per change in position, $\Delta x$); backing up an additional distance $\Delta x$ will not only yield a second measure of the first derivative but will also yield a measure of the second derivative. With these various order derivatives one could employ a Taylor Series expansion-like approach. One could also use Runge-Kutta, Adams-Moulton or other forms of Numerical Calculus or Dynamic Simulation or the like.

An analog circuit could be constructed using such analog circuits as op-amps, integrators, adders, and the like.

Many types of display mechanisms could be used instead of the meter—LCD displays or other electronic graphical displays showing a pointer or otherwise indicating a direction, LED's along the top edge of the rear window, projected beams of light from a laser diode movably mounted, and a wind-vane like pointer movably mounted on top of a rod extending up from the top of the hitch are a few alternate display possibilities.

Another variation might be to replace the pointing device with a video system or use the video in addition to the pointing device. Such a variation might comprise a video camera or image sensor on the back of the vehicle or on the back of the trailer and a video monitor visible to the operator. This might be especially useful for tall trailers that may block the view from the vehicle. The camera could be movable mounted such that the left to right direction of the camera is motor controlled (i.e., motorized panning) instead of or in addition to the pointer. In this way, the image on a monitor screen in the vehicle would show where the trailer is going to go by turning the camera such that the target is kept in the center of the screen. The angle would be adjusted because if the camera is on the trailer and the trailer is already turned by the angle of the hitch, one would not want to incorporate the hitch angle component of the projected direction twice (the project angle reflects the amount of turning of the vehicle to come in-line with the trailer, but the trailer is already partly turned in the direction of that projected direction). In addition, an on screen indicator could notify the driver when a jackknife condition is reached of imminent (instead of having the camera swing off to the side). Alternatively, the camera could remain fixed while an on screen indicator (e.g., a superimposed line, arrow, icon, or other graphic) would identify the target direction of the trailer on the video monitor. This variation has the added benefit of a safety camera monitoring system for safer backing. Some drivers may prefer a left-to-right mirror imaging of the camera image to facilitate more comfortable steering.

Another variation would compute all targeted directions for a measure of the turning radius and hitch angle in advance and might store this data in memory. In this way, a low cost microprocessor (one that might not be powerful enough to perform the iterative calculations in real time, but that might be able to build the table during an initialization sequence) could be utilized and the direction of the pointer could be looked up from the values of the steering and hitch angle. This initialization sequence could be infrequent if non-volatile memory was utilized. This approach might require a large capacity storage device that may add to the cost of the device. Alternatively, only certain representative or key points would be calculated and the values in between could be interpolated (thereby eliminating, at least, the processor-intensive, iterative computations). A set of values calculated in this way for a given vehicle and trailer might look like the table of data shown in FIG. 10. Furthermore, these data points could be determined empirically by measuring the hitch and steering angle and the resulting in-line trailer direction for a given vehicle and trailer configuration (a rather laborious approach that would work best if a common configuration of vehicle and trailer was anticipated and the calculated approach was, as a result of processor limitations or other reasons, impractical or unavailable). The table could be constructed for combinations of hitch angle and turning radius in which case the vehicle based sensor would have to provide turning radius instead of steering angle (thereby incorporating the wheel base and hitch length) and the table could then be preprogrammed for the specific trailer to be used therewith (this table might be stored in the hitch angle sensor unit). This latter variation would be appealing to trailer manufacturers who might desire to build a trailer with the present invention included without regard to the vehicle with which it may be used.

It is believed that an additional variation would enable the backing up of tandem tractor-trailer rigs. With the installation of a device according to the present invention that can perform two instances of the algorithms, one instance for the hitch angle of each trailer, the angle of the front trailer would be regulated not to point directly at the target destination, but rather to provide the proper hitch angle to the second trailer such that that second trailer was directed at the target. The precision afforded by the present invention should be enough that neither trailer should ever deviate too far from the in-line orientation thereby making it possible to implement this variation.

The foregoing description of an example of the preferred embodiment of the invention and the variations thereon have been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by any claims appended hereto.

I claim:

1. A method of determining a direction for a first vehicle connected to and being pushed by a second vehicle comprising the steps of:
   a) measuring the angle of the connection between the first and second vehicle,
   b) measuring the amount of turning of the second vehicle,
   c) determining a projection of the direction for the first and second vehicle at that point where the first and second vehicle would become generally in-line given said angle of the connection between the first and second vehicle and the amount of turning of the second vehicle.

2. The method of claim 1 further comprising controlling the direction of said first vehicle by controlling the direction of said second vehicle based upon said projection of the direction.

3. The method of claim 1 further comprising the step of indicating the projection of the direction of the first and second vehicle at the point where the first and second vehicle would become generally in-line.

4. The method of claim 3 whereby control of said amount of turning of said second vehicle is controlled by a human operator.

5. The method of claim 2 whereby control of said amount of turning of said second vehicle is controlled by an automatic driving device.

6. The method of claim 2 whereby control of said amount of turning of said second vehicle is controlled by a semi-automatic driving device involving a human operator.

7. The method of claim 1 whereby said determination of the projection of the direction of said vehicles comprises the calculation $\mathrm{Sin}^{-1}(\Delta x \, \mathrm{Sin}(\Theta)/2L)$ or its equivalent or approximation thereof, where $\Delta x$ is a distance traveled by said second vehicle, $\Theta$ is the angle of the connection between said first and second vehicles, and L is the distance from the point of the connection between said first and second vehicles to the point of rotation of the first vehicle.

8. The method of claim 1 whereby said determination of the projection of the direction of said vehicles comprises the calculation $180\Delta x/\pi R$ or its equivalent or approximation thereof, where $\Delta x$ is a measure of a distance traveled by said second vehicle and R is a measure of the turning radius of said second vehicle.

9. The method of claim 3 whereby indicating the projection of the direction comprises display means to visually show said projected direction.

10. The method of claim 9 whereby said display means comprises a pointing device that points in said projection of the direction.

11. The method of claim 9 whereby said display means comprises a graphical display.

12. The method of claim 9 whereby said display means comprises a video capture device and video image display device.

13. The method of claim 12 whereby said video image capture device is movable and is controlled to point in the projected direction of said first vehicle.

14. The method of claim 12 whereby the image displayed on said video image display device further comprises an indication of the projected direction of said first vehicle.

15. The method of claim 12 whereby the image displayed on said video image display device is shown as a left-to-right mirror image.

16. A device for projecting the direction of travel of a first vehicle being pushed by a second vehicle comprising:

a) an angle measuring device to measure the angle of the connection between the first and second vehicle, b) a turn measuring device to measure the amount of turning of the second vehicle, c) a direction determining device to determine a projection of the direction of said vehicles where said first and second vehicle would become generally in-line.

17. A system comprising a first vehicle and a second vehicle connected by a movable joint, further comprising:

a) an angle measuring device to measure the angle of the connection between the first and second vehicle, b) a turn measuring device to measure the amount of steering of the second vehicle, c) a direction determining device to determine a projection of the direction of said vehicles where said first and second vehicle would become generally in-line.

18. The device of claim 16 where said device to determine the projected direction of said vehicles comprises calculating where said vehicles would become generally in-line.

19. The device of claim 16 where said device to determine the projected direction of said vehicles comprises looking up in a data table where said vehicles would become generally in-line.

20. The device of claim 19 where said data table is created by calculating projected directions for combinations of angles for the connection between the first and second vehicle and amounts of turning of the second vehicle.

* * * * *